No. 610,668. Patented Sept. 13, 1898.
G. R. WILSON.
TOASTER.
(Application filed Dec. 24, 1897.)
(No Model.)
Fig. 1.
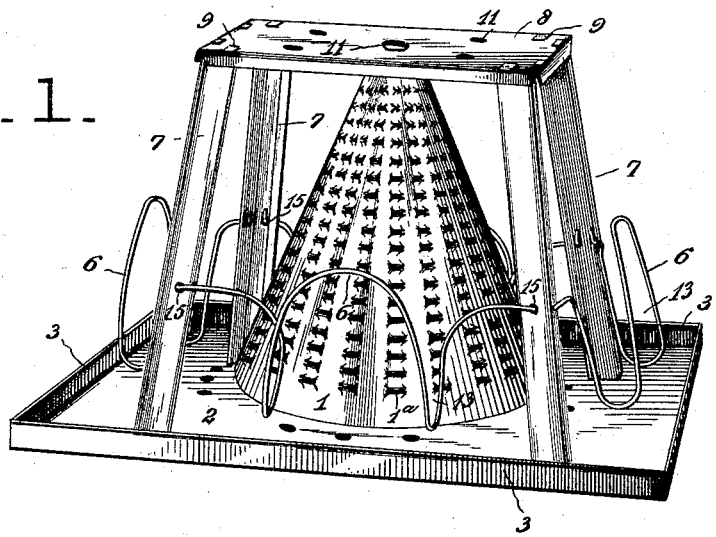
Fig. 2.
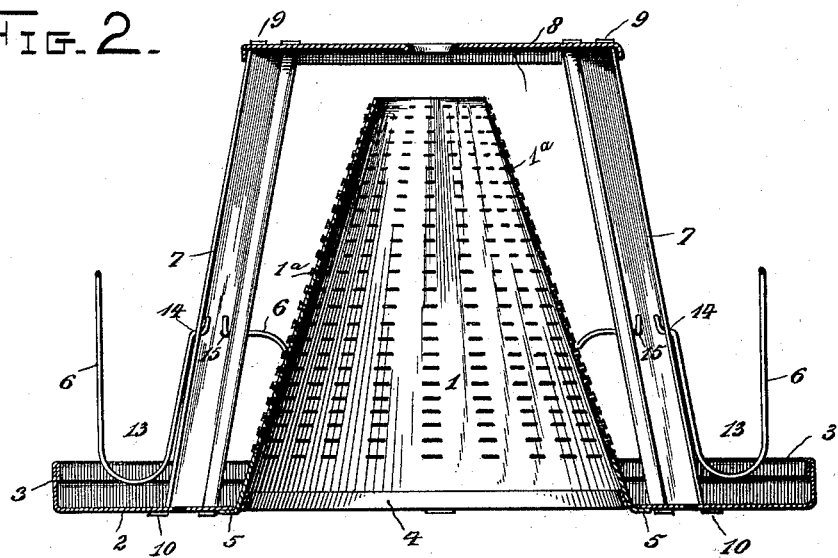
Fig. 3.
Witnesses
Inventor
George R. Wilson
By his Attorneys,

UNITED STATES PATENT OFFICE.

GEORGE RUSSELL WILSON, OF AUSTIN, MINNESOTA.

TOASTER.

SPECIFICATION forming part of Letters Patent No. 610,668, dated September 13, 1898.

Application filed December 24, 1897. Serial No. 663,287. (No model.)

*To all whom it may concern:*

Be it known that I, GEORGE RUSSELL WILSON, a citizen of the United States, residing at Austin, in the county of Mower and State of Minnesota, have invented a new and useful Toaster, of which the following is a specification.

This invention relates to improvements in toasters.

The object of the present invention is to improve the construction of toasters and to provide a simple, strong, and durable one designed to be used in connection with an oil, gas, or similar heater and adapted to conduct all smoke, gases, and odor from such a heater to the top of it and prevent them from coming in contact with the bread being toasted.

A further object of the invention is to provide a device capable of uniformly toasting bread and adapted to prevent crumbs from falling into a burner and enable them to be readily removed when it is desired to clean the toaster.

Another object of the invention is to provide a toaster which will be adapted to form a support for a pot or analogous receptacle, so that it may be readily employed for making tea and coffee and for cooking.

The invention consists in the construction and novel combination and arrangement of parts, as hereinafter fully described, illustrated in the accompanying drawings, and pointed out in the claims hereto appended.

In the drawings, Figure 1 is a perspective view of a toaster constructed in accordance with this invention. Fig. 2 is a vertical sectional view of the same. Fig. 3 is a detail view of one of the bread-supporting brackets.

Like numerals of reference designate corresponding parts in all the figures of the drawings.

1 designates a truncated conical radiator constructed of sheet metal and centrally secured at its base to a rectangular tray 2 over an opening thereof, and the tray, which is constructed of sheet metal, is provided with a marginal flange 3 and with an annular flange 4, extending upward from the central opening. The conical radiator, which is perforated at intervals, is provided at its lower edge with tongues 5, passing through slots of the tray and bent against the lower face of the same. The upper end or top of the conical radiator is open to permit the escape of gas, smoke, and odor from the burner and prevent them from being forced through the perforations of the radiator into contact with the bread, which is supported by wire brackets 6. The brackets 6 are detachably secured at their ends to posts or standards 7, which converge upwardly slightly and support a horizontal top plate 8, of sheet metal. The posts or standards consist of angle-bars of sheet metal strengthened at the edges by bending the sheet metal on itself and provided at their ends with tongues 9 and 10, passing through slots of the top plate 8 and the tray 6 and engaging the same. The top plate, which is firmly supported by the standards or posts 7, is located a short distance above the top of the conical radiator to permit the free escape of the heat and other products of combustion, and it is provided with perforations or openings 11 for the passage of the same, so that such products of combustion may impinge against a pot, kettle, or other receptacle placed upon the top plate. By this construction the top plate or vessel placed thereon is evenly heated and the device may be advantageously employed for cooking or making tea or coffee. The perforations $1^a$ of the conical radiator are produced by puncturing the metal from the inner face of the cone, or rather from the face of the metal which is to be the inner face of the cone, so that the conical radiator will present a smooth inner face and will be provided on its outer face with flanges, as clearly illustrated in Fig. 2 of the accompanying drawings. The smooth inner face prevents the flame of a burner or a current of heat impinging against a flange or projection and carrying with it smoke or odor which follows such current and which would find lodgment in the bread being toasted. The smoke and odor are not checked in their outward passage, and the flames at the top of the horizontally-elongated perforations $1^a$ also serve to exclude the same and prevent them from passing through the perforations $1^a$. The smooth inner face of the conical radiator also greatly facilitates cleaning the same. The base or tray 6 is provided at intervals adjacent to the conical radiator with perforations for the passage of heat and to facilitate an even distribution of the same.

A bread-supporting bracket is arranged at each side of the toaster and is constructed of a single piece of wire bent to form a substantially U-shaped outer side and curved inner sides 13, which are provided at their upper terminals with substantially L-shaped inwardly-extending arms 14, engaging perforations of the posts or supports 7, and the upper portions of the inner sides 13 are horizontal and are arranged on the outer faces of the standards or supports 7. The angle or L-shaped arms are introduced into the perforations 15 of the posts or supports when the bread-supporting bracket is in a substantially horizontal position, and when the bracket is swung downward to its normal position the outer portions of the arms are arranged vertical and bear against the inner faces of the posts or supports. The resiliency of the material of which the brackets are constructed holds them firmly in engagement with the posts or supports, and they are adapted to be readily disengaged therefrom by swinging them upward to a horizontal position and slightly compressing them. As the bread-supporting brackets must be swung upward to detach them from the standards or supports the weight of their contents will operate to maintain them in their engagement with the same.

In operation the ascending flame, being compressed by the construction of the cone, is largely forced through the perforations at the base, browning by convection, while toward the apex of the cone the confined and compressed heat-supply is imparted to a greater degree to the metal of the cone, thereby being transformed into radiant heat, which reinforces the diminished effects of the ascending partially-cooled air-currents. Between these two extremes the processes merge insensibly into each other, thus securing uniformity of browning upon the whole exposed surface of the bread.

The invention has the following advantages: The toaster is simple and comparatively inexpensive in construction and easily manufactured, and it is so constructed that it will convey all smoke, gases, and odor out at the top, as it has a perfect draft, and it will prevent them from coming in contact with the bread being toasted. The tray prevents crumbs from falling into a burner. The brackets are readily detachable when it is desired to clean the device, and the interior of the conical radiator is smooth, which facilitates cleaning the interior.

Changes in the form, proportion, and minor details of construction may be resorted to without departing from the spirit or sacrificing any of the advantages of this invention.

What I claim is—

1. A device of the class described, comprising a base, a truncated conical radiator mounted on the base, standards rising from the base and extending above the radiator, and a top plate mounted on the standards and supported by the same above the upper end of the radiator, the space between the upper end of the radiator and the top plate being entirely open at the sides of the device, whereby the products of combustion are permitted to pass directly from the device, substantially as described.

2. A device of the class described, comprising a base, a conical radiator mounted upon the base and constructed of sheet metal, and provided with horizontal elongated perforations formed by puncturing the metal from the inner face to provide a smooth inner face and to form exterior flanges to prevent smoke and gas from passing through the perforations, and a top plate supported above the conical radiator to provide an open space above the same to permit the products of combustion to pass directly from the device at that point, substantially as described.

3. A device of the class described, comprising a base, a radiator mounted thereon, a top plate, supports for the same provided with openings, and the bread-supporting brackets provided at opposite sides with portions to engage the outer faces of the supports and having inwardly-extending L-shaped arms 14, detachably engaging the openings, the inner portions of the L-shaped arms being extended upward, whereby the bread-supporting brackets must be swung upward to disengage them from the supports, substantially as described.

4. A device of the class described, comprising a base, a top plate, supports for the same provided with openings, a radiator, and a bread-supporting bracket provided with means for detachably engaging the openings of the supports, said means being extended upward at the inner sides of the supports, whereby the bread-supporting bracket must be swung upward to detach it and is maintained in engagement by the weight of its contents, substantially as described.

In testimony that I claim the foregoing as my own I have hereto affixed my signature in the presence of two witnesses.

GEORGE RUSSELL WILSON.

Witnesses:
F. H. SCHMALING,
JAMES KEENAN.